(12) United States Patent
Varma et al.

(10) Patent No.: US 8,156,385 B2
(45) Date of Patent: Apr. 10, 2012

(54) SYSTEMS AND METHODS FOR BACKWARD-COMPATIBLE CONSTANT-TIME EXCEPTION-PROTECTION MEMORY

(75) Inventors: Pradeep Varma, New Delhi (IN); Rudrapatna K. Shyamasundar, Mumbai (IN); Harshit J. Shah, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/607,625

(22) Filed: Oct. 28, 2009

(65) Prior Publication Data

US 2011/0099429 A1  Apr. 28, 2011

(51) Int. Cl.
  *G06F 11/36* (2006.01)
(52) U.S. Cl. ......... 714/53; 714/38.1; 171/124; 171/126; 171/127
(58) Field of Classification Search .............. 714/53, 714/38.1
  See application file for complete search history.

(56) References Cited

U.S. PATENT DOCUMENTS

| | | | |
|---|---|---|---|
| 6,128,623 A | 10/2000 | Mattis et al. | |
| 6,289,358 B1 | 9/2001 | Mattis et al. | |
| 6,823,507 B1 * | 11/2004 | Srinivasan et al. | 717/152 |
| 7,472,316 B2 * | 12/2008 | Kikuchi et al. | 714/701 |
| 7,818,799 B2 * | 10/2010 | Chen et al. | 726/22 |
| 2005/0120276 A1 * | 6/2005 | Kolawa et al. | 714/38 |
| 2006/0070039 A1 * | 3/2006 | Bates et al. | 717/129 |
| 2007/0234296 A1 * | 10/2007 | Zorn et al. | 717/124 |
| 2008/0140968 A1 | 6/2008 | Doshi et al. | |
| 2009/0271763 A1 * | 10/2009 | Varma et al. | 717/114 |

OTHER PUBLICATIONS

Periklis Akritidis et al, "Baggy Bounds Checking: An Efficient and Backwards-Compatible Defense against Out-of-Bounds Errors", USENIX Security Symposium, Aug. 2009.
Varma, Pradeep et al, "NextGen eXtreme Porting—Structured by Automation", 2005 ACM Symposium on Applied Computing, Mar. 13-17, 2005, Santa Fe, New Mexico, USA.
Varma, Pradeep, "Generalizing Recognition of an Individual Dialect in Program Analysis and Transformation", Symposium on Applied Computing, Mar. 11-15, 2007, Seoul, Korea.
Xu, Wei et al, "An Efficient and Backwards-Compatible Transformation to Ensure Memory Safety of C Programs", SIGSOFT 2004/FSE-12, Oct. 31-Nov. 6, 2004, Newport Beach, Calfornia, USA.

(Continued)

*Primary Examiner* — Scott Baderman
*Assistant Examiner* — Chae Ko
(74) *Attorney, Agent, or Firm* — Ference & Associates LLC

(57) ABSTRACT

Embodiments of the invention provide a table-free technique for detecting all temporal and spatial memory access errors in programs supporting general pointers. Embodiments of the invention provide such error checking using constant-time operations. Embodiments of the invention rely on fat pointers, whose size is contained within standard scalar sizes (up to two words) so that atomic hardware support for operations upon the pointers is obtained along with meaningful casts in-between pointers and other scalars. Optimized compilation of code becomes possible since the scalarized-for-free encoded pointers get register allocated and manipulated. Backward compatibility is enabled by the scalar pointer sizes, with automatic support provided for encoding and decoding of fat pointers in place for interaction with unprotected code.

24 Claims, 8 Drawing Sheets

```
// presumed: heap_offset_bits
// presumed void * protected_heap_first
typedef unsigned long word;
#define H (1 << heap_offset_bits)
#define version_bits (sizeof(word) * CHAR_BIT – heap_offset_bits)
#define no_of_versions (1 << version_bits)
word unused_heap_offset = 0;
#define marker_value ... // random
typedef struct
    {word v : version_bits;
     word offset : heap_offset_bits;
    } P;
typedef struct
    {P meta1;  // stores version, next
     P meta2;  // stores marker, previous
     char o[k];
    } L_k;
word allocated_list_k =0;        // initialized empty
word free_list_k = 0;            // initialized empty
word unusable_free_list_k = 0;   // initialized empty
word last_version_k = no_of_versions – 2;
```

Basic declarations

OTHER PUBLICATIONS

Cho, Dae Wan et al, "A new approach to detecting memory access errors in C programs", 6th IEEE/ACIS International Conference on Computer and Information Science (ICIS 2007).

Varma, Pradeep et al, "Backward-compatible constant-time exception-protected memory", ACM Symposium on Applied Computing, Conference '04.

Yoshino, Toshihiro, "A Framework Using a Common Language to Build Program Verifiers for Low-Level Languages", A Master Thesis submitted to the Graduate School of Information Science and Technology at the University of Tokyo on Feb. 7, 2006, 74 pages.

Qin, Feng, et al., SafeMem: Exploiting ECC-Memory for Detecting Memory Leaks and Memory Corruption During Production Runs, in proceedings of the 11th International Symposium on High-Performance Computer Architecture, Feb. 12-16, 2005, pp. 291-302. IEEE Computer Society, Washington, DC.

* cited by examiner

```
// presumed: heap_offset_bits
// presumed void * protected_heap_first
typedef unsigned long word;
#define H (1 << heap_offset_bits)
#define version_bits (sizeof(word) * CHAR_BIT – heap_offset_bits)
#define no_of_versions (1 << version_bits)
word unused_heap_offset = 0;
#define marker_value ... // random
typedef struct
    {word v : version_bits;
     word offset : heap_offset_bits;
    } P;
typedef struct
    {P meta1;   // stores version, next
     P meta2;   // stores marker, previous
     char o[k];
    } L_k;
word allocated_list_k = 0;       // initialized empty
word free_list_k = 0;            // initialized empty
word unusable_free_list_k = 0;   // initialized empty
word last_version_k = no_of_versions – 2;
```

Figure 1. Basic declarations

```
// translate version-carrying pointer
void * decode_pointer (void * ptr)
{ return protected_heap_first + ((P *) &ptr)->offset; }
bool verify (void * ptr) {
    return ((P *) &ptr) ->v ==
        ((((P *) decode_pointer(ptr)) – 2) ->v; }
```

Figure 2. Read/write related operations

```
void * allocate_protected_k () {
P * ptr, meta;
if (free_list_k != 0)  // allocate from free list
  { ptr->offset = free_list_k;
    meta = ((P *) (protected_heap_first + free_list_k)) – 2;
    ptr->v = meta->v;
    free_list_k = meta-> offset; }
  // allocated from unused heap
else if (H – unused_heap_offset >= k + 2 * sizeof(P) ) {
    ptr->offset = unused_heap_offset + 2 * sizeof(P);
    meta = (P *) (unused_heap_offset + protected_heap_first);
    meta->v = (last_version_k + 2) % no_of_versions;
    (meta + 1)->v = marker_value;
    unused_heap_offset = unused_heap_offset + k + 2 * sizeof(P) ;
    ptr->v = meta->v;}
else return NULL;  // indicates failure to allocate
meta->offset = allocated_list_k;
if (allocated_list_k != 0)        // set previous
  (((P *) (protected_heap_first + allocated_list_k)) -1)->offset
      = ptr->offset;
allocated_list_k = ptr->offset;   // set head of list
(meta + 1) -> offset = 0;  // set previous
return *((void **) ptr);  /* return encoded pointer */ }
```

Figure 3. Allocation

```
bool increment_version (P * meta, word last) {
    word gap = (last + (no_of_versions – meta->v)) % no_of_versions;
    meta->v = (meta->v + 1 ) % no_of_versions;
    return (gap != 0);
} void deallocate_protected_k (void * ptr) {
    P * meta = ((P *) decode_pointer(ptr)) – 2 ;
    word next = meta->offset;
    word previous = (meta + 1) -> offset;
    // modify object version and add to appropriate free list
    if (increment_version(meta, last_version_k))
        { meta->offset = free_list_k;
          free_list_k = ((void *) (meta + 2)) – protected_heap_first;}
    else {meta->offset = unusable_free_list_k;
          unusable_free_list_k = ((void *) (meta + 2)) – protected_heap_first;}
    // remove from allocated list
    if (previous == 0)  allocated_list_k = next;    // reset next
    else (((P *) (protected_heap_first + previous)) – 2)->offset = next;
    if (next != 0)
        (((P *) (protected_heap_first + next)) – 1)->offset = previous; }
```

Figure 4. Deallocation

```
struct L {word marker1 : version_bits;
    word size : heap_offset_bits;
    word v : version_bits;
    word next: heap_offset_bits;
    word marker2: version_bits;
    word previous: heap_offset_bits;
    word init;                    // initialization flags
    doubleword[ ⌈sizeof(T)/sizeof(doubleword)⌉ ] o;}
```

Figure 5. Aligned object layouts

```
struct PG {
    word v : version_bits; word offset : heap_offset_bits;  // word 1
    word intra_object_pointer;                              // word 2
}
```

Figure 6. General pointer layout

```
struct P^R {
    signed word intra_object_offset : intra_object_offset_bits;
    word v : version_bits;
    word offset : heap_offset_bits;
}
```

Figure 7. Reduced-heap pointer layout

SYSTEMS AND METHODS FOR BACKWARD-COMPATIBLE CONSTANT-TIME EXCEPTION-PROTECTION MEMORY

BACKGROUND

Memory safety in the context of C/C++ became a concern a decade or so after the advent of the languages. A memory access error can be described as a dereference outside the bounds of the referent, either address-wise or time-wise. The former comprises a spatial access error, for example, array out of bounds access error, and the latter comprises a temporal access error, for example, dereferencing a pointer after the object has been freed. In previous work, a system was developed to detect such errors relatively precisely (viz. temporal access errors, whose treatment earlier had been limited). However, that system had limited efficiency (temporal error checks had a hash-table implementation with worst-case linear costs; for large fat pointer structures, register allocation was compromised with accompanying performance degradation; execution-time overheads were benchmarked above 300%). The fat pointers also compromised backward compatibility. Significant work has subsequently transpired on these error classes because of the very hard to trace and fix attributes of these errors. The insight into temporal access errors, namely that object lifetimes can be caught as a pointer attribute, a capability, has led to several works—Electric Fence, PageHeap, and its follow-ons.

BRIEF SUMMARY

Embodiments of the invention provide a table-free method for detecting all memory access errors. Errors covered include uninitialized memory accesses, which are checked in constant time for all types, and not just pointers using a Purify-like technique whose coverage is complete for small allocations and is approximate otherwise. Coverage of all other memory errors is complete within constant time. Fat pointers are of scalar sizes, amenable to aggressive optimization, atomic use, and meaningful casts. Backward compatibility support is provided extensively, including scalar fat pointers and automatic support for encoding and decoding of pointers.

In summary, one aspect of the invention provides a method comprising: utilizing one or more processors to execute a program of instructions, the program of instructions comprising computer readable program code configured to: in programs supporting general pointers, detect all types of temporal and spatial memory access errors, including uninitialized memory accesses; wherein all types of temporal and spatial memory access errors are checked in constant time; wherein coverage of said uninitialized memory accesses is complete for small allocations and is approximate otherwise; and wherein coverage of all other memory errors is complete within constant time.

Another aspect of the invention provides an apparatus comprising: one or more processors; and a computer readable storage medium having computer readable program code embodied therewith and executable by the one or more processors, the computer readable program code comprising: computer readable program code configured to, in programs supporting general pointers, detect all types of temporal and spatial memory access errors, including uninitialized memory accesses; wherein all types of temporal and spatial memory access errors are checked in constant time; wherein coverage of said uninitialized memory accesses is complete for small allocations and is approximate otherwise; and wherein coverage of all other memory errors is complete within constant time.

A further aspect of the invention provides a computer program product comprising: a computer readable storage medium having computer readable program code embodied therewith, the computer readable program code comprising: computer readable program code configured to, in programs supporting general pointers, detect all types of temporal and spatial memory access errors, including uninitialized memory accesses; wherein all types of temporal and spatial memory access errors are checked in constant time; wherein coverage of said uninitialized memory accesses is complete for small allocations and is approximate otherwise; and wherein coverage of all other memory errors is complete within constant time.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 1 illustrates a set of basic declarations according to an embodiment of the invention.

FIG. 2 illustrates read/write -related operations according to an embodiment of the invention.

FIG. 3 illustrates allocation according to an embodiment of the invention.

FIG. 4 illustrates deallocation according to an embodiment of the invention.

FIG. 5 illustrates aligned object layouts according to an embodiment of the invention.

FIG. 6 illustrates general pointer layout according to an embodiment of the invention.

FIG. 7 illustrates reduced-heap pointer layout according to an embodiment of the invention.

DETAILED DESCRIPTION

Figure 8:
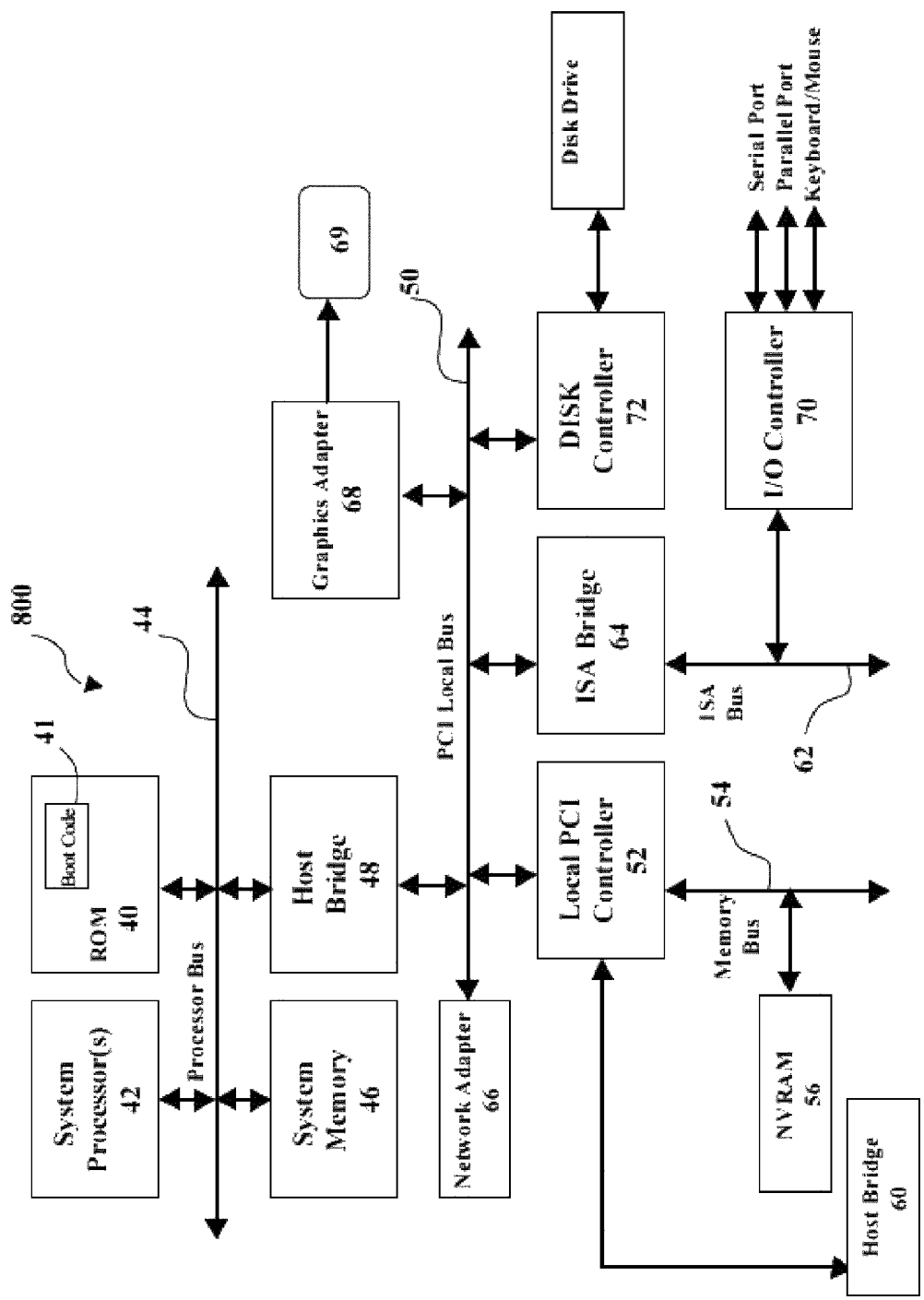
FIG. 8 illustrates a computer system according to an embodiment of the invention.

It will be readily understood that the components of the embodiments of the invention, as generally described and illustrated in the FIGS. herein, may be arranged and designed in a wide variety of different configurations in addition to the described exemplary embodiments. Thus, the following more detailed description of the embodiments of the invention, as represented in the FIGS., is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

Embodiments of the invention provide safety support for memory systems. According to embodiments of the invention, there is no capability store or table or page table that is required to be looked up each time an object is accessed. Exemplary embodiments of the invention work using the notion of a capability as an object version that is stored with the object itself and thus is available in cache with the object for lookup within constant time. In effect, an object is the C standard's definition, namely, a storage area whose contents may be interpreted as a value, and a version is an instantiation or lifetime of the storage area.

With this, the overheads for temporal access error checking, according to embodiments of the invention, can asymptotically be guaranteed to be within constant time. Furthermore, since each object has a version field dedicated to it, the space of capabilities is partitioned at the granularity of individual objects and is not shared across all objects, as in previous works, and is more efficient than a capability as a virtual page notion of Electric Fence, PageHeap and the like. According to embodiments of the invention, this feature lets versions be represented as a bitfield within the word that effectively contains the base address of the referent (as an offset into a pre-allocated protected heap), which means that one word is saved for capabilities, in comparison to the encoded fat pointers of previous work, without compromising on the size of the capability space. Since versions are tied to objects, the object or storage space is dedicated to use solely by re-allocations of the same size (unless garbage collector (gc) intervenes). This fixedness of objects is put to further use by saving the referent's size with the object itself (like version), saving another word from the pointer metadata.

The savings that are made on the pointer metadata are crucial in bringing encoded pointers down to standard scalar sizes of one or two words in contrast to the 4-plus words size and similar price of other works. Standard scalar sizes mean that encoded pointers according to an embodiment of the invention assist backward compatibility, avail of standard hardware support for atomic reads and writes, can be meaningfully cast to/from other scalars, and achieve higher optimization via register allocation and manipulation.

Embodiments of the invention detect memory access errors at the level of memory blocks. A memory block comprises the least unit of memory allocation such as a global or local variable, or the memory returned by a single invocation of malloc. Embodiments of the invention detect all memory errors at this level, except for uninitialized data reads, where it does more than previous approaches by flagging all uninitialized data reads and not just uninitialized pointer reads using a Purify-like approach. The coverage of uninitialized data reads in this manner is complete for small objects, and is approximate for large objects.

By detecting memory access errors at the level of memory blocks, embodiments of the invention target the general pointer arithmetic model supported by C, with de-references disallowed only when they cross allocation bounds and not while they remain within. So for instance, a safe memory( ) can be written that takes an element pointer of a struct and copies up or down without exception so long as it remains within the allocated memory for the struct. Arithmetic can cause a pointer to cross allocation boundaries arbitrarily; only de-references have to be within the allocated memory, as in previous work.

Fat pointer approaches have suffered from backward compatibility problems because fat pointers change structure layouts. C programs often assume that the size of a pointer is the same as that of a long integer in structure layouts. A union or a cast from a pointer to an integer may make similar assumptions. These assumptions break when large fat pointers are used in place of normal pointers. Library binaries, compiled for non-fat pointers, index structures using offsets that mismatch the fields of structures containing fat pointers. For these reasons, previous work diverged in storing pointer metadata separately from the pointers themselves. While this improves backward compatibility somewhat, this previous work is still hobbled by having to pass meta-data parameters to functions separately from the pointer parameters, forcing interface changes with functions for both parameters passed in and results returned back. There is also no support for generating the metadata associated with unknown pointers returned by library functions.

An exemplary embodiment of the invention provides much better support for backward compatibility than previous approaches using scalar-sized fat pointers. There are two incarnations of general pointer layouts according to exemplary embodiments of the invention—the general-heap layout, and a reduced-heap layout. The general layout uses a two-word scalar representation of the general pointer and the reduced-heap layout uses a one-word scalar representation. Backward compatibility offered by reduced-heap layouts is ideal—the encoded general pointer has the same scalar size as an un-encoded pointer (one word). Similarly, the backward compatibility offered by the simpler version of pointers according to embodiments of the invention is ideal—it provides full heap sizes and one (1)-word encoded pointers. These pointers can be used with pre-compiled libraries with very effective backward compatibility. The general pointer layout (two word scalar) would also offer similar compatibility if it were possible to obtain vendor libraries in which pointer sizes are double-word scalars. Once encoded pointers and un-encoded pointers of the same scalar size have been obtained, backward compatibility reduces to the ability to provide un-encoded versions of the pointers to a library via arguments and encoded versions of the same to application code when the library returns results.

Embodiments of the invention provide novel, automatic support for encoding and decoding of pointers. So a library can continue with processing un-encoded pointers only while the application deals with encoded pointers alone and the interface uses the automatic support to transform pointers in place between the application and the libraries. Similarly, unprotected code manipulating pointers as integers can be provided un-encoded pointers at the time of the cast to integer and un-encoded pointers obtained from a cast from integers can be converted into encoded pointers using this support.

All capability-based systems have a problem in that they can run out of capability space (version space according to various embodiments of the invention). This is because the capability fields have a fixed size and hence the number of capabilities they represent is fixed while a long-running program can engender an unbounded number of object lifetimes. Except for a previous work, which approaches this issue primarily from a static analysis (automatic pool allocation) approach, no work has targeted recycling of capabilities. Embodiments of the invention utilize a comprehensive extension of a technique assuming a (conservative) garbage collector that makes it possible to handle unbounded heap recycling.

Accordingly, embodiments of the invention provide a table-free method for detecting all memory access errors. Errors covered include uninitialized memory accesses, which are checked in constant time for all types, and not just pointers using a Purify-like technique whose coverage is complete for small allocations and is approximate otherwise. Coverage of all other memory errors is complete within constant time; fat pointers are of scalar sizes, amenable to aggressive optimization, atomic use, and meaningful casts. Backward compatibility support is provided extensively, including scalar fat pointers and automatic support for encoding and decoding of pointers. Benchmarks show that time overhead for memory-intensive applications averages less than 55%, which is much lower than the nearest prior work.

Previous work in temporal access error checking only covers dangling pointer checks for heap-allocated objects. Embodiments of the invention use version numbers that correspond to virtual page numbers in previous work, except that virtual page numbers are shared and looked up via the hardware memory management unit (MMU). While only one version number is generated per allocated object according to embodiments of the invention, a large object can span a sequence of virtual pages in previous work, all of which populate the MMU and affect its performance. Version numbers according to embodiments of the invention are typed by object size and are table-free in terms of lookup. This implies that the object lookup cost is guaranteed to be constant, while for previous work it varies according to table size even if OS/hardware supported. For example, consider the scenario when the table outgrows the number of pages held in a hardware table. TLB misses cost are described as a concern in previous work. There is also concern in previous work at the fact that an allocation/deallocation engenders a system call apiece, which is expensive.

A system according to an embodiment of the invention treats memory violations—temporal and spatial—in an integrated manner. According to embodiments of the invention, versions are substantially more efficient in the virtualization they offer compared to previous work, wherein each object allocation, however small, blocks out a full virtual page size and large objects block out multiple virtual pages. By contrast, the virtualization overhead according to embodiments of the invention comprises a small constant addition to the object size. Virtual space overuse (simultaneously live objects) has no concomitant performance degradation for embodiments of the invention, while in previous work, it can cause paging-mechanism-related thrashing which would affect not only the application process, but also other processes in the machine.

Previous work presents a table-based framework to handle temporal and spatial memory access errors. The framework does not obtain constant-time operations, as according to embodiments of the invention. Overhead for an allocation operation is linear in the number of pointers to be stored in an allocated block. Space for the metadata associated with these pointers is computed and allocated with the block, and initialized as invalid pointers. Also, an allocation request can trigger an expansion of the expandable array store comprising the heap capabilities, which in turn has a linear cost in terms of the total expansion made as the additional slots have to be initialized as the free list of capability slots.

As regards safety checking once pointers have been allocated, not all pointer accesses can be checked using previous work, given that pointer metadata in previous work is stored separately from pointers themselves using a source-to-source transformation scheme. Checking safety of a pointer usage requires mirroring access to the pointer by a parallel access to its separately stored metadata, which is not always possible in the approach of previous work, which uses statically-exposed access paths.

According to embodiments of the invention, the metadata overhead for fat pointers comprises one extra word at most while the (separately stored) metadata per pointer in previous work comprises two words for capability alone (corresponding to versions as discussed in connection with exemplary embodiments of the invention). Additionally, the size of the memory block (referent) pointed to is stored as pointer metadata. Also, an attempt to separate metadata from pointers (that is, not have fat pointers) results in additional overhead of a link field in the pointer metadata. While some of this metadata per pointer gets reduced by sharing it and storing it in the pointed to object, the scheme is unable to reach the shared metadata by pointer arithmetic and ends up having to store an additional pointer to it. In previous work, the size argument of malloc is used to determine whether an allocation is for an object or array; C programs may use malloc otherwise, which would not work with previous approaches.

Still other previous work presents a table-based technique for checking spatial memory violations in C/C++ programs. Standard pointers are used unlike fat pointers of prior spatial access error checkers obtaining significant backwards compatibility as a result. Others extend prior approaches with out-of-bounds object that allow inbound-pointer-generating arithmetic on an out-of-bounds pointer. Embodiments of the invention utilize a scalar, fat-pointer based technique that has this ability independently.

Still others have used automatic pool allocation to partition the large table of objects. This technique statically analyzes application sources. Embodiments of the invention differ from this type of approach and its predecessors by not relying on any table lookup. Embodiments of the invention do not impose any object padding for out-of-bound pointers either. General pointer arithmetic (inbound/out-of-bound) over referent objects is supported by embodiments of the invention.

Other previous work presents a run-time type checking scheme that tracks extensive type information in a "mirror" of application memory to detect type-mismatched errors. The scheme concedes expensiveness performance-wise (due to mirror costs, not constant time ops—for example, type information generated is proportional to object size including aggregate objects) and does not comprehensively detect dangling pointer errors (fails past reallocations of compatible objects analogous to Purify).

Purify maintains a map of memory at run-time in checking for memory safety. It offers limited temporal access error protection (not safe for reallocations of deleted data) and fails for spatial access errors once a pointer jumps past a referent into another valid one. Similarly, a dynamic binary instrumentation framework has been developed that tests for undefined value errors and offers Purify-like protection up to bit-level precision. In contrast to these works, embodiments of the invention capture all dangling pointer errors and spatial errors (for example, de-reference of a reallocated freed object or de-reference past a referent into another valid but separate referent). While prior work typically slows application performance by well over an order of magnitude, embodiments of the invention only limited constant costs to program operations. Also, prior work computes some false positives and false negatives within its framework compared to embodiments of the invention, which has no false positives. According to embodiments of the invention, false negatives are limited to uninitialized data checks, wherein coverage of large objects is approximate.

CCured provides a type inference system for C pointers for statically and dynamically checked memory safety. The approach, however, ignores explicit deallocation, relying instead on Boehm Weiser conservative garbage collection for space reclamation. It also disallows pointer arithmetic on structure fields. The approach creates safe and unsafe pointer types, all of which have some runtime checks. Objects carry size and type tag information. No asymptotic complexities are provided.

Cyclone is a significant enough type-safe variant from ANSI C to require significant porting effort of C programs. In Cyclone, dangling pointers are prevented through region analysis and growable regions and garbage collection. Free( ) is a no-op, and gc carries out space reclamation. Fail-Safe C uses gc for memory reuse ignoring user-specified memory reclamation.

Other efforts present a randomized memory manager approach to handling memory safety errors by increasing redundancy (replicating computation; and multiplying heap size, which is similar to Purify's larger heap requirements in support of heap aging). Still other approaches use sample-based adaptive profiling to dynamically build and monitor a heap model, identifying long-unused, stale objects as potential leaks. Embodiments of the invention can easily replicate this using a list of allocated objects. Further, using the gc extension, this can further guarantee whether an object is a memory leak or not (no pointers left, yet object is live).

The description now turns to the Figs. The illustrated embodiments of the invention will be best understood by reference to the Figs. The following description is intended only by way of example and simply illustrates certain selected exemplary embodiments of the invention as claimed herein.

The flowchart and block diagrams in the Figs. illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Protected Heap Management

Exception protected memory resides in a dedicated heap for the purpose called the protected heap. The stack and global space resides outside the protected heap. Only the protected heap has to have contiguous space reserved for it, which is arranged at the beginning of a program run.

Suppose N is the number of bits used to represent pointers to the address space (that is, the standard word size, for example, 64 bits, in a 64-bit architecture). For a protected heap size of $2^M$ bytes, M is the number of bits needed for addressing bytes in the heap. Then N−M bits remain unused for addressing purposes. These bits can be used for defining version numbers of objects as follows.

A version n is the nth time the same object or storage space (as defined by ANSI C99 standard) has been allocated to hold a value. Storage space is allocated just before the value is constructed and deallocated just after the value is destroyed. Since pointers to an object may survive after the object has been deallocated, the determination that a pointer points to the current object or an earlier version is made using the version bits. The scheme allows $2^{N-M}$ distinct version numbers, following which version bits must be re-cycled after proving safe recyclability. For a typical 64-bit word machine containing 64-bit pointers, suppose a protected heap of size 4 gigabytes (that is, $2^{32}$ bytes) is desired. Then versions totaling $2^{64-32}=2^{32}=4$ G in number are supported (after which version recycling needs to be carried out).

A basic technique consistent with exemplary embodiments of the invention is described using C pseudo-code in the Figs. Pseudo-code algorithms are presented, and constant-time complexity of the exemplary scheme in presented later in this description. The alignment considerations are for the time being ignored for simplicity, but will be addressed later. Incorporating alignment is discussed separately herein. In the Figs., $H=2^{heap\_offset\_bits}$ is the protected heap size. The allocated layout for an object of type T is L_sizeof(T), where L_k is defined as given in FIG. 1. Note that the layout only involves the size of the type T and not the type itself Thus the various object lists (FIG. 1) manage objects solely by size, and allow storage sharing partitioned by size, not type. Herein it is assumed that no bitfield is of size 0 (the size 0 cases are straightforward special cases).

An exemplary technique for the statically-known size layouts is now described (dynamic sizes are addressed elsewhere herein). Simple, one (1)-word pointers are used herein to access the objects using the encoding for pointers, P, given in FIG. 1. For this encoding, a void * pointer is cast to a word P prior to being destructured thus. These simple one (1)-word pointers are incapable of modeling intra-object pointers (to members), which is discussed elsewhere herein.

In FIG. 1, word is the machine wordsize (For example, 32 bits, or 64 bits). CHAR_BIT is the number of bits in a byte, ordinarily 8. Encoded pointers track addresses by the offset (P.offset) from the first location in the protected heap (protected_heap_first). The pointer into the protected heap for unused space is another offset called unused_heap_offset. A marker_value is a random bitmask used for backward compatibility purposes. An encoded pointer P is one word long comprising a version v bitfield and an offset bitfield. The metadata in an object L_k comprises two words, both laid out like P. The first word, meta1, stores the object's version bitfield and an offset to the next object in the linked list that the object belongs to (allocated objects list, free list et cetera.). The second word, meta2, holds marker_value in its version bits for the purpose of backwards compatibility (discussed later) and an offset to the previous object in the linked list so the object management queues can be doubly-linked lists. All offset fields that point to objects, in pointers, heads of lists below, or in objects themselves, always point past the metadata in the pointed object, that is to the member o[ ] in L_k above. This means a non-empty list has a non-zero head field, allowing 0 to be reserved to indicate an empty list.

For each size k, there are three global lists for managing objects:

1) A doubly-linked list of allocated objects which allows any object to be deallocated in constant time. Among other purposes, this list enables encoding of un-encoded pointers returned by un-protected code to provide support for backward compatibility.

2) A free list (free_list_k) of previously freed objects that can be used at the next allocation.

3) An unusable list (unusable_free_list_k) of previously freed objects that can no longer be reused because they have run out of fresh, usable version numbers and require version recycling.

Both the free list and the unusable list store objects with the version number advanced to a previously unused version. Thus, upon allocation (after recycling for unusable_free_list k) this version number can be used directly. Because of this structure, if a dangling pointer test is carried out when a freed object is sitting on one of these two lists, the test will work correctly since the dangling pointer will be encoded with a previously used version while the freed object will have an unused one. The unusable free list is unusable, not because it cannot be allocated from, but because an object allocated by it cannot be freed later (without a preceding recycling).

Without recycling, versions would be allocated in increasing, round-robin order from 0 until no_of_versions−1, where the last version is reserved for residence on the unusable list. While a full treatment of recycling is not in the scope of this description, it suffices to say that the upper limit of version allocations also wraps around and moves within the range [0 . . . no_of_versions−1]. The limit separates freed version numbers from versions that may still be in use. This limit is tracked by last_version_k that moves round-robin in the range of version numbers. It is initialized to no_of_versions−2 since at the start, no recycling is involved, and no_of_versions−1 is reserved for the unusable list whose objects and object pointers are known to not be in use.

An encoded pointer is translated to standard C pointer in FIG. 2 by obtaining the offset field within the pointer and adding that to protected_heap_first. Pointer decoding precedes each dereference of the object. Prior to decoding the pointer thus, memory safety check requires that the version stored in the object be consistent with the version stored in the pointer. This can be carried out by verify, wherein the right hand side of the equality test carries out the former and the left hand side carries out the latter.

The allocation procedure is statically customized to size k (prefix k in allocate_protected_k). First an attempt to allocate from the free list is made. If that fails, then an attempt to allocate from the unused heap is made. In this attempt, the version assigned is taken to be two past the (rotating) last_version_k limit. As mentioned, one past the last_version_k is number reserved for the unusable free list. If allocation does not succeed from either free list or unused heap, then an allocation failure is indicated by returning NULL. NULL is a constant, encoded pointer to a constant, never-deleted, zero-sized object (that is, has no o[ ] field) allocated in the protected heap at the beginning of program execution. While checking against NULL can be treated as a special case check to be added explicitly to the verify operation in FIG. 2, this check is gracefully merged into usual spatial error checking, as discussed further herein. Returning NULL indicates allocation failure.

Allocation creates and populates an encoded pointer (ptr) with the pertinent offset and version v fields. Once an object to allocate is obtained, meta points to the start of the metadata affiliated with the object. Finally, the object metadata is modified to reflect the doubly-linked structure of allocated_list_k. The previous offset field of any existing head object is set to the newly allocated object; the newly allocated object's previous is set to 0, reflecting its position at the head; the head points to the newly allocated object and the newly allocated object's next points to the previous head object.

Deallocation is also customized to size k. In FIG. 4, it is presumed that verify is executed beforehand to verify version and non-NULL legality.

A successful deallocation increments (via increment_version_k) the version of the object that can be used both while sitting on a free list or by the next allocation. In incrementing, if it is found that the last_version_k limit is crossed, then the object is placed on the unusable free list, otherwise it is placed on the standard free list. The crossing of last_version_k is decided by computing the gap between the current version and the limit. Suppose last_version_k$\mu$ meta->v. Then gap in FIG. 4 should be last_version_k−meta->v, which is indeed the case as the modulo arithmetic drops the no_of_versions addition. Suppose last_version_k<meta->v. Then gap in FIG. 4 should be last_version_k+(no_of_versions−meta->v), which again is the result offered by the modulo arithmetic. Thus FIG. 4 computes the correct gap in all cases.

Alignment Issues

Type alignment can be built in simply by allocating objects along the most general alignment, doubleword boundaries. FIG. 5 shows the allocation layout for an object of type T.

The space cost of rounding sizeof(T) up to a multiple of doubleword can be reduced directly to a multiple of word. However, the allocation interface would then become different from the standard one for malloc( ) which only takes object size as the argument and not alignment.

The size field in FIG. 5 allows spatial safety checks to be carried out, as discussed further herein. Bitfields marker1 and marker2 are used to place fixed bit patterns in the protected heap to aid backward compatibility searches, as discussed further herein.

Another departure the layout in FIG. 5 makes over the simpler layout in FIG. 1 is that an init field is kept for the purpose of un-initialized access checks in the allocated object. This is a Purify-like approach wherein the object is divided into equal areas; each represented by an initialization flag. A write sets the area's init flag. If a read is carried out in an area before the init bit is set, it indicates an un-initialized field access. This approach captures un-initialized reads of all types, and not just pointer types as is obtained in previous work. Furthermore, since the number of flags is a constant, the initialization checks (for example, resetting flags upon object allocation) all transpire in constant time unlike the linear-in-object-size cost of previous work. For small objects, the flags cover initialization errors comprehensively, for large objects, the coverage is approximate.

One of the useful features of this arrangement is that all meta data for object o wastes no padding bits or bytes and minimally occupies four words before member o. Furthermore there is no padding after member o if its alignment is doubleword. The stored object size in an object's metadata omits the padding incurred by the field o in rounding to a doubleword. This is for the purpose of accurate spatial checks.

General Arithmetic-Supporting Pointers

In C/C++, pointers are scalar types so they ought to be represented within one or two machine words (consistent with standard scalar sizes). FIG. 6 presents general encoded pointers in two words according to embodiments of the invention.

In the layout of general pointers (PG), the first word encodes version-carrying pointer data as discussed in the algorithms presented herein (FIGS. 1-4). The second word stores a regular un-encoded pointer that can point to any inner member of the object. This pointer is not stored as an offset and occupies a whole word so that following C's semantics, general pointer arithmetic can shift this pointer around the whole machine address space (within and beyond protected heap) without bothering whether the pointer points to a valid object or not. Thus, C's general pointer arithmetic is fully supported (it is carried out directly on the un-encoded pointer). Validity checking occurs only when a pointer is dereferenced, to check whether the object pointed to is inbound or not.

A reduced-heap implementation of a pointer consistent with embodiments of the invention is given in FIG. 7. This implementation is pertinent when the heap requirements of a program are small. In the context of migration of 32-bit programs to 64-bit platforms, even the largest useful heap sizes can well be the largest supported by 32-bit systems. The doubled size of a 64-bit pointer means that meta-data beyond the bits needed for addressing the largest 32-bit heaps can be stored within one 64-bit pointer. The meta-data stored beyond heap_offset_bits required to address the heap is optimized by converting the one (1)-word occupying intra_object_pointer from FIG. 6 to an intra_object_offset in FIG. 7. This conversion is based on the insight that an intra-object pointer is likely to mostly remain inbound.

The number of bits required to represent intra object offset is computed by the following static analysis. The maximum size of an object allocated by the program is estimated (this is typically known from the associated type in case of non-array objects). The size is bounded by the protected heap size, which can further be bounded more tightly by the user, in which case a dynamic bounds check each time an object is allocated is carried out. The maximum deviation of a pointer out-of-bounds is estimated. For this, it is known that the maximum deviation by pointer arithmetic can only occur prior to a dereference using the pointer. The dereference dynamically checks for the pointer being inbound. Each pointer, if properly initialized, is initialized as inbound or a NULL pointer, wherein the intra_object_offset is zero. Proper initialization is verified statically for now. The maximum that a pointer can deviate beyond this inbound or zero offset into invalidity is bound by the largest chain of pointer arithmetic operations that can be executed in the program before a dereference of the pointer. A static proof that each pointer arithmetic operation must be succeeded within a finite path by a dereference of the pointer is sufficient to bound the maximum deviation. The deviation is the maximum sum of the pointer offsets carried out along any such path in the program. This is carried out intra-procedurally according to embodiments of the invention, as this seems to be quite sufficient.

Once the maximum bound on any pointer's outbound excursion is computed, intra object_offset_bits is computed as 1+log2 (maximum excursion bound+maximum allocated object size). If the maximum excursion bound is not a known constant, the reduced heap implementation is not used. The extra bit is required for the sign bit to cover negative offsets.

The object layout for a reduced-heap implementation changes from FIG. 5 to include padding equivalent to intra_object_offset field in each of the first three meta-data words.

Spatial test for a reduced-heap pointer comprises casting its intra_object_offset to an unsigned word and checking whether it is less than the unsigned object size. This is a fast one-comparison test (instead of conjunction of two tests for upper and lower bounds), in which negative offsets are always larger than any object size due to the contribution of the sign bit (note that size is represented in heap_offset_bits which are always fewer than a word due to version bits). Spatial test for a general-heap pointer uses the same test as discussed herein, after generating an intra_object_offset equivalent from the offset and the intra_object_pointer fields.

As described herein, the NULL pointer is encoded to point to an object of size 0, which means that its spatial test will always fail. This is a special object containing only meta-data fields. NULL pointer dereferences are caught as spatial errors during dereferences, which eliminates special-case treatment. For a free operation, it is checked that the intra-object-offset is 0 besides the regular spatial and temporal checks.

Pointer arithmetic operations are modified to increment or decrement the intra_object_offset or intra_object_pointer fields in an encoded pointer. Note that this maintains pointer arithmetic operations as constant-time operations.

Statically Unknown Allocations

Given that C's malloc takes a dynamic size argument, the search of the corresponding object lists (or allocation/deallocation functions as described herein) is a dynamic cost. While for the large majority of cases, the dynamic size would be tied to a (statically-known) type's allocation (hence sizeof( ) is known statically), a user is free to allocate space completely dynamically (for example, one of the benchmarks here, MST, allocates an array of size provided by user input dynamically). For the former case of the statically known types, the search can be eliminated statically as described in FIGS. 1-4. For the unusual, fully dynamic case, the search cost can be bounded to a constant as follows: Dedicate a Pth portion (P is a constant) of the protected heap of size H as a search array to contain access data for all dynamic sizes handled by the heap. Memory other than the protected heap can be used for this purpose. The pth slot in the array can contain access data for sizes [p*P . . . (p+1)*P −1] within itself that can be searched in time proportional to constant P. In effect this search array provides a hash table with constant search size (clash per bucket). This method may be fine-tuned based on static/dynamic profiling/analysis of information of the sizes actually generated by the program.

Stack and Globals Protection

Any stack scalar variable requiring run-time protection checks for the storage it represents (for example, an automatic variable whose address is taken) is shifted to the heap. This is straightforwardly done by wrapping the variable's type in a struct. An automatic variable initialized by the struct allocation is then generated so that every time it is instantiated in a new stack frame, the struct is heap allocated. References to the original scalar are replaced by references to the automatic variable's struct member. Each time the stack frame is destroyed, the structs allocated for its variables are deallocated so that no later dereferences are allowed. At the time the stack frame is destroyed, the pointers to the allocated structs are checked for liveness as a part of deallocation. If any of the structs has been deallocated before, then an exception is thrown, which catches the user deallocation of stack variables.

Backward Compatibility

As mentioned herein, the scalar sizes of fat pointers according to embodiments of the invention can enable them to be compiled at the same size as standard pointers. Backward compatibility then reduces to the problem of providing encoding and decoding support for pointers when interacting with unprotected code through libraries, pointer casts to integers, et cetera. Of these, the decoding problem is simple; the interface code walks over the data to be passed to unprotected code and calls decode_pointer (FIG. 2) and replaces encoded pointers with decoded pointers in place (in data). The NULL pointer is decoded to the standard C NULL pointer as a special case. The problem of encoding non-NULL pointers passed back from un-protected code is more involved and is as described below.

First, the allocation functions linked to un-protected/library code are made variants of the protected heap allocation functions as follows. The allocator returns protected heap objects on request, with the change that a decoded pointer to the object is returned, and not an encoded pointer. Prior to returning the object, the decoded pointer and its encoded version are stored in a global table for use later by interface functions.

Once the unprotected/library code finishes executing and the interface to the code is reached, all data returned by the unprotected code is walked in order to replace decoded pointers by encoded ones. The global table populated by allocations above is used as an association list in this replacement process as is the set of decodings that were carried out when the unprotected code was entered.

The association list of encoded/decoded pointers cannot suffice in general. For the decoded pointers whose encoding is still not found, the following method may be used. From the location pointed by the decoded pointer in protected heap, a preceding pair of marker1 marker2 patterns is located in the heap. A sanity check that these are indeed intended marker values is carried out by traversing the previous and next fields relative to the markers to locate their objects and corresponding marker values. Consistency check with these objects increases confidence in the pattern discovery. In searching for the preceding markers of a decoded pointer, only preceding memory up to the size of the largest-allocated object has to be searched. The search starts from the nearest preceding marker pair such that the associated size field keeps the decoded pointer within bounds of the associated object. For each such candidate object, the previous object in the doubly-linked list of objects is looked up. Each shift to a previous object is checked for consistency with a traversal back using the next link. If a consistent traversal back to an allocated_list_k header is obtained, only then it is assured that the starting marker values represent a valid, live object. Once the validity of the object containing the decoded pointer is verified, then the encoded pointer is generated straightforwardly. It is assumed that for non-NULL pointers, the unprotected code only returns pointers intended to be inbound and to live objects. If no live containing object is found, then an error is reported.

An integer cast to pointer generates an un-decoded pointer initially, which is then converted to an encoded pointer as discussed above. Similarly encoded pointers are cast to integer by first converting them to decoded pointers.

Performance

As far as the asymptotic performance regarding embodiments of the invention is concerned, note that none of the routines in FIGS. 1-4 (and their general pointer discussion) have any loops or recursion. Any search cost for object lists/accessors for any object size k is constant as described using P-denominated structures. Thus, the cost for providing memory safety (allocation, deallocation, pointer arithmetic, and verification overhead) in a system according to an embodiment of the invention comprises only constant time operations.

The cost constants according to embodiments of the invention are now discussed. For this, both reduced-heap and general implementations run on a 64-bit machine (AIX 6.1.0.0, Power5 2.09 GHz, 4G RAM) using GCC 4.2.4 for compilation at—–O3 level of optimization, with version recycling/garbage collection within the system completely disabled. Performance was benchmarked on the memory-intensive applications of the Olden Suite, which comprises programs that have been commonly benchmarked by the relevant related work. Only publicly available Olden applications were benchmarked (all that could be found, which were from the Cyclone site, containing four Olden applications in all, see http://www.cs.umd.edu/projects/PL/cyclone/benchmarks-1.0.tar.gz). The benchmarks contain several NULL-dereference errors, all of which were caught by an exemplary embodiment of the invention. For the benchmarks, the general and reduced-heap implementations were chosen such that all encoded pointer bitfields are rounded to multiples of a byte. This enables a specialized kernel to be generated in which bit-field access gets replaced by field access and pointer arithmetic in general. For each benchmark program, a manually-generated version of the program was created, encompassing safety-related checks that called safety-related functions provided as a co-compiled kernel.

The general-heap benchmarks use one-byte version_bits and four-byte heap_offset_bits, wasting three-bytes as padding. The reduced-heap implementation uses one-byte version_bits, three-byte intra_object_offset_bits, and four-byte heap_offset_bits. Due to the lack of 128-bit integer types in GCC (encoding as a 128-bit long double runs into a GCC bug at –O3 level optimization), a split of the 128-bit general-heap-encoded pointer into two 64-bit unsigned long quantities (one the intra_object_pointer and the other containing the version_bits and heap_offset_bits) was made. The two longs are carried everywhere the original pointer is, as scalars using a straightforward manually-implemented source-to-source transformation. When storing the pointer in memory, or communicating with the external world, the two longs are placed adjacent to each other just as they would be in a 128-bit layout (FIG. 6).

A manually-implemented static analysis (for intra-object-offset field size) establishing these benchmarks to be capable of reduced-heap implementation also establishes proper initialization, which means that the run-time initialization check mechanism is eliminated from these benchmarks. Furthermore, no stack or global variables require heap-shifting (as none of them involve arrays, or have their address taken). These optimizations are commensurate with the optimizations carried out in previous works. While previous works do incur an extra dynamic overhead of resetting any pointers in allocated memory blocks, this cost is minor (resetting allocated blocks to 0 adds less than 0.2% to original application times). Hence, the cost comparison is generous, since prior work has additional run-time optimizations enabled eliminating expensive temporal checks dynamically and other prior work uses a combination of static and run-time methods in automatic pool allocation to reduce run-time costs. Results are shown in Table 1 and contrasted with prior work ([1] Safe-C (Austin, T. M., Breach, S. E., and Sohi, G. S., *Efficient detection of all pointer and array access errors*, Proc. ACM SIGPLAN 1994 Conf. Programming Language Design and Implementation (Orlando, Fla., United States, Jun. 20-24, 1994) PLDI '94. ACM, New York, N.Y., 290-301; DOI=http://doi.acm.org/10.1145/178243.178446), [2] Dhurjati, D. and Adve, V., *Efficiently Detecting All Dangling Pointer Uses in Production Servers*, Proc. Int. Conf. Dependable Systems and Networks (June, 2006) DSN '06. IEEE Computer Society, Washington, DC, 269-280, and [3] Xu, W., DuVarney, D. C., and Sekar, R, *An efficient and backwards-compatible transformation to ensure memory safety of C programs*, Proc. 12th ACM SIGSOFT Int. Symposium on Foundations of Software Engineering (Newport Beach, Calif., USA, Oct. 31-Nov. 6, 2004) SIGSOFT '04/FSE-12; ACM, New York, N.Y., 117-126; DOI=http://doi.acm.org/10.1145/

1029894.1029913). The column unprotected run time gives the average time taken by an application for one run in a batch of twenty runs. The times are measured using getrusage( ) system call and comprise the user+system times. The cost of setting up the protected heap using an sbrk( ) call is included in each application's time.

TABLE 1

Benchmarks of Olden Suite Applications

| Benchmark | Unprotected run time (seconds) | Reduced Heap (overhead, %) | General Heap (overhead, %) | Safe-C [1] (overhead) (%) | [2] (overhead, %) | [3] (overhead, %) |
|---|---|---|---|---|---|---|
| TREEADD | 1.00 | 15 | 38 | — | 268 | 223 |
| MST | 0.35 | 94 | 98 | 400 | 853 | 76 |
| BISORT | 3.17 | 49 | 57 | — | 222 | 76 |
| TSP | 2.90 | 49 | 24 | — | 312 | 128 |
| Average | 1.86 | 52 | 54 | 400 | 414 | 126 |

Among the benchmarks, MST performed the worst, in part because it accesses the kernel via the P-denominated structures. This is because MST dynamically allocates arrays of a size that is provided as user input. Hence, allocations for these arrays become dynamically-sized and the kernel access acquires a layer of dynamic deconstruction, as described herein. In the reduced heap case, the application using fixed array sizes was also benchmarked. This reduced the overhead down to 83%, an improvement of 11.3% that brings the average overhead of reduced heap implementation to below 49% (for programs which do not have dynamically-sized mallocs).

Note that on average, embodiments of the invention perform better than the nearest prior work by a factor of 2.33 for general heap and 2.42 for reduced heap. Herein reported are comparisons with prior works, since they share similar goals of complete memory safety for C without changing the memory model (free( )not obviated by garbage collection). Also considered herein is prior work having temporal checking via virtual pages, which is close to the core concept of versions as described herein. Other approaches that haven't been contrasted here have different goals (changed memory model—CCured, Cyclone, and Fail-Safe C; or address a subset of safety issues (mostly spatial). Embodiments of the invention thus advance the state of the art in complete memory safety for C-like languages by well over a factor of 2.

Embodiments of the invention may be implemented in one or more computing devices configured appropriately to execute program instructions consistent with the functionality of the embodiments of the invention as described herein. In this regard, FIG. 8 describes a non-limiting example of such a computing device.

Referring now to FIG. 8, there is depicted a block diagram of an illustrative embodiment of a computer system 800. The illustrative embodiment depicted in FIG. 8 may be an electronic device such as a desktop computer, workstation computer, laptop computer, mobile computing device and the like. As is apparent from the description, however, the embodiments of the invention may be implemented in any appropriately configured device, as described herein.

As shown in FIG. 8, computer system 800 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 800 to LAN, and graphics adapter 68, which interfaces computer system 800 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 800 further includes Industry Standard Architecture (ISA) bus 62, which is coupled to PCI local bus 50 by ISA bridge 64. Coupled to ISA bus 62 is an input/output (I/O) controller 70, which controls communication between computer system 800 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing one or more processors to execute a program of instructions, the program of instructions comprising computer readable program code configured to:
in programs supporting general pointers, detect all types of temporal and spatial memory access errors, including uninitialized memory accesses;
wherein all types of temporal and spatial memory access errors are checked in constant time;
wherein coverage of said uninitialized memory accesses is complete for small allocations and is approximate otherwise; and
wherein coverage of all other memory errors is complete within constant time.

2. The method according to claim 1, wherein the computer readable program code is further configured to utilize fat pointers of scalar size to provide backward compatibility support.

3. The method according to claim 2, wherein to provide backward compatibility support further comprises providing support for encoding and decoding of pointers.

4. The method according to claim 2, wherein the scalar size is two words.

5. The method according to claim 2, wherein the scalar size is one word such that an encoded general pointer has a same scalar size as an un-encoded pointer.

6. The method according to claim 1, wherein the computer readable program code is further configured to utilize an object version that is stored with an object itself and thus is available in cache with the object for lookup within constant time.

7. The method according to claim 6, wherein said object version is represented as a bitfield within a word that effectively contains a base address of a referent as an offset into a pre-allocated protected heap; and wherein one word is saved for capabilities without compromising on capability space size.

8. The method of claim 7, wherein encoding pointers as offsets into a pre-allocated heap reduces a space requirement of pointers to an offset bitfield, enabling remaining bits to be used for encoding meta-data.

9. The method according to claim 1, wherein said all types of temporal and spatial memory access errors are detected at memory block level except for uninitialized data reads; and wherein said uninitialized data reads are flagged.

10. The method according to claim 1, wherein an explicit NULL pointer dereference check is subsumed and eliminated by a standard spatial check via use of a special NULL object, thereby minimizing run-time checks and costs.

11. An apparatus comprising:
one or more processors; and
a computer readable storage medium having computer readable program code embodied therewith and executable by the one or more processors, the computer readable program code comprising:
computer readable program code configured to, in programs supporting general pointers, detect all types of temporal and spatial memory access errors, including uninitialized memory accesses;
wherein all types of temporal and spatial memory access errors are checked in constant time;
wherein coverage of said uninitialized memory accesses is complete for small allocations and is approximate otherwise; and
wherein coverage of all other memory errors is complete within constant time.

12. The apparatus according to claim 11, wherein the computer readable program code is further configured to utilize fat pointers of scalar size to provide backward compatibility support.

13. The apparatus according to claim 11, wherein to provide backward compatibility support further comprises providing support for encoding and decoding of pointers.

14. The apparatus according to claim 13, wherein the scalar size is two words.

15. The apparatus according to claim 13, wherein the scalar size is one word such that an encoded general pointer has a same scalar size as an un-encoded pointer.

16. The apparatus according to claim 11, wherein the computer readable program code is further configured to utilize an object version that is stored with an object itself and thus is available in cache with the object for lookup within constant time.

17. The apparatus according to claim 16, wherein said object version is represented as a bitfield within a word that effectively contains a base address of a referent as an offset into a pre-allocated protected heap; and wherein one word is saved for capabilities without compromising on capability space size.

18. The apparatus according to claim 17, wherein encoding pointers as offsets into a pre-allocated heap reduces a space requirement of pointers to an offset bitfield, enabling remaining bits to be used for encoding meta-data.

19. The apparatus according to claim 11, wherein said all types of temporal and spatial memory access errors are detected at memory block level except for uninitialized data reads; and
wherein said uninitialized data reads are flagged.

20. The apparatus according to claim 11, wherein an explicit NULL pointer dereference check is subsumed and eliminated by a standard spatial check via use of a special NULL object, thereby minimizing run-time checks and costs.

21. A computer program product comprising:
a computer readable storage medium having computer readable program code embodied therewith, the computer readable program code comprising:
computer readable program code configured to, in programs supporting general pointers, detect all types of temporal and spatial memory access errors, including uninitialized memory accesses;
wherein all types of temporal and spatial memory access errors are checked in constant time;
wherein coverage of said uninitialized memory accesses is complete for small allocations and is approximate otherwise; and
wherein coverage of all other memory errors is complete within constant time.

22. The computer program product according to claim 21, wherein the computer readable program code is further configured to utilize fat pointers of scalar size to provide backward compatibility support.

23. The computer program product according to claim 21, wherein the computer readable program code is further configured to utilize an object version that is stored with an object itself and thus is available in cache with the object for lookup within constant time.

24. The computer program product according to claim 23, wherein said object version is represented as a bitfield within a word that effectively contains a base address of a referent as an offset into a pre-allocated protected heap; and wherein one word is saved for capabilities without compromising on capability space size.

* * * * *